(12) United States Patent
Cook

(10) Patent No.: US 10,768,045 B1
(45) Date of Patent: Sep. 8, 2020

(54) LARGE FORMAT THREE-MIRROR DISPERSIVE SPECTROMETER OPTICS

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 16/552,597

(22) Filed: Aug. 27, 2019

(51) Int. Cl.
| | |
|---|---|
| G01J 3/28 | (2006.01) |
| G01J 3/02 | (2006.01) |
| G01J 3/04 | (2006.01) |
| G01J 3/18 | (2006.01) |

(52) U.S. Cl.
CPC ............. *G01J 3/021* (2013.01); *G01J 3/0208* (2013.01); *G01J 3/04* (2013.01); *G01J 3/18* (2013.01)

(58) Field of Classification Search
CPC .. G01J 3/021; G01J 3/0208; G01J 3/18; G01J 3/04; G01J 3/00; G01J 3/02; G01J 3/28; G01J 3/26
See application file for complete search history.

(56) References Cited

U.S. PATENT DOCUMENTS

2019/0250033 A1* 8/2019 Zhu .................. G01J 3/024

OTHER PUBLICATIONS

Reimers et al. "Freeform spectrometer enabling increased compactness", Light: Science & Applications (2017) vol. 6, pp. 1-10.

* cited by examiner

Primary Examiner — Abdullahi Nur
(74) Attorney, Agent, or Firm — Lando & Anastasi, LLP

(57) ABSTRACT

All-reflective optics for use in imaging spectrometers. In one example, an imaging spectrometer includes an entrance slit and spectrometer optics consisting of a primary mirror, a secondary mirror having a diffraction grating formed thereon, and a tertiary mirror, each of the primary mirror, the secondary mirror, and the tertiary mirror having free-form non-rotationally symmetric surface figures defined by Zernike polynomials. The spectrometer optics are configured to receive the telecentric image at the entrance slit, to disperse the optical radiation into its spectral components to provide dispersed optical radiation, and to focus the dispersed optical radiation onto an image plane positioned in a common plane with the entrance slit. The spectrometer optics have a physical length that is twice the length of the entrance slit, a ratio of a distance of the secondary mirror from the entrance slit to a distance of the primary mirror from the entrance slit being approximately 0.32.

19 Claims, 5 Drawing Sheets

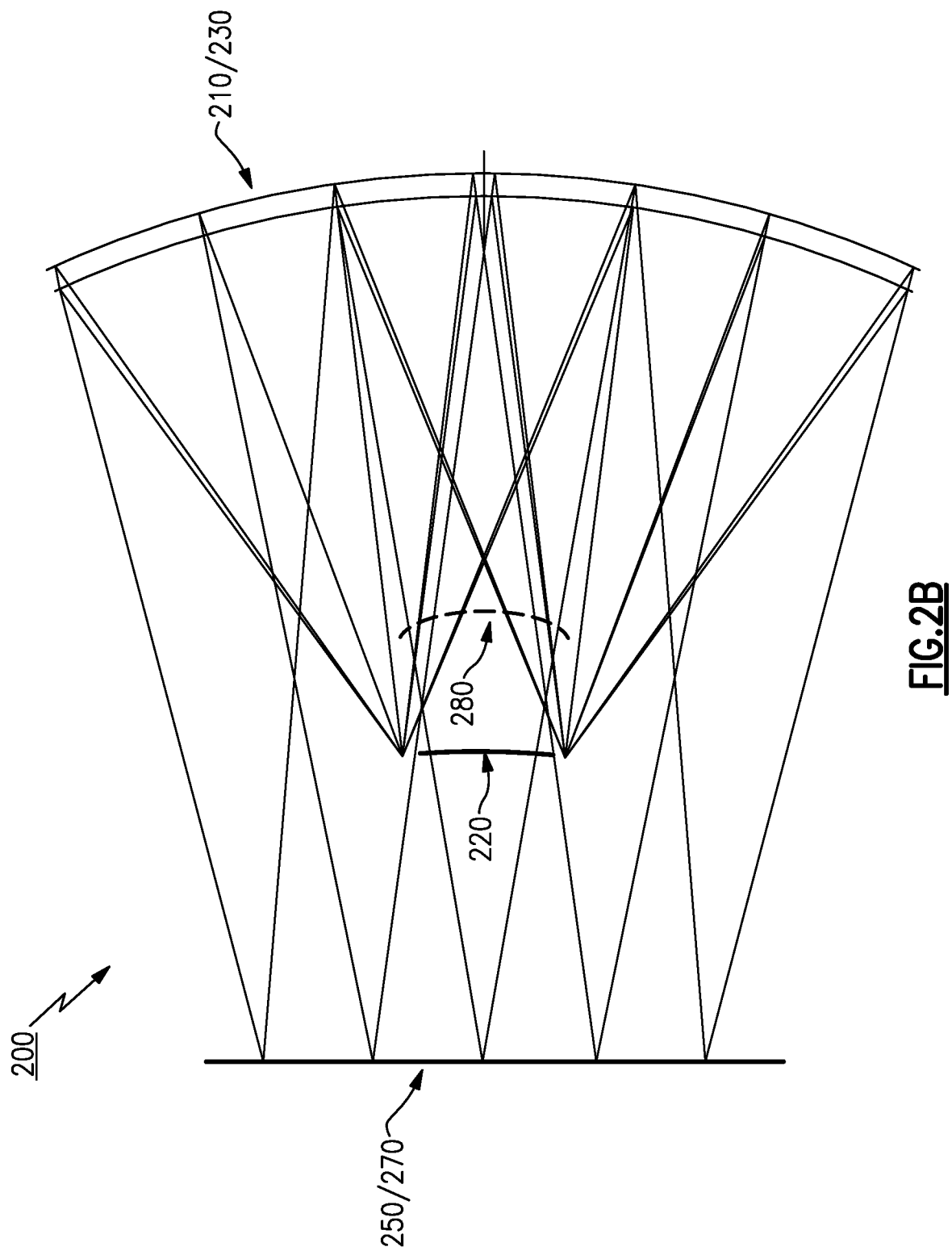

LARGE FORMAT THREE-MIRROR DISPERSIVE SPECTROMETER OPTICS

BACKGROUND

A common all-reflective optical design used for imaging spectrometers is known as the Offner-Chrisp spectrometer, which is based on the Offner ring-field geometry. The classical Offner geometry is a 1:1 relay consisting of two concentric spherical mirrors, where the primary mirror is used twice in reflection. In an Offner spectrometer, the secondary mirror of the 1:1 relay is replaced with a reflective, convex grating having a groove spacing chosen based on the required spectral dispersion and physical dimensions of the imaging sensor.

The Offner-Chrisp imaging spectrometer, described in U.S. Pat. No. 5,880,834, for example, is a modified version of the Offner spectrometer, in which the primary mirror is split into two mirrors with slightly different radii. An example of the Offner-Chrisp optics geometry is shown in FIG. 1. The Offner-Chrisp spectrometer is a three mirror, ring-field design with 1:1 magnification where all three spherical mirrors are concentric, with a diffraction grating placed on the convex secondary mirror surface. Referring to FIG. 1, incident optical radiation 100 is received via an entrance slit (not shown), reflected from a first mirror 110 to the secondary mirror 120, where the diffraction grating disperses the optical radiation 100 into is spectral components to provide dispersed optical radiation 140 that is reflected from the secondary mirror 120 to a third mirror 130. The dispersed optical radiation 140 is reflected from the third mirror 130 and focused onto an imaging sensor 150. The Offner-Chrisp imaging spectrometer retains the near-concentric property of the classical Offner relay, while providing additional degrees of freedom toward the correction of aberrations by allowing the radii of curvature of the first and third mirrors to be slightly different. The radius of curvature of the diffraction grating, and therefore of the secondary mirror 120, is governed by the grating density and the spectral dispersion at the image plane (where the imaging sensor 150 is located), and may be determined by specifications such as the spatial and spectral image size needed for a particular applications. Since all three optical surfaces are concentric, the size of the spectrometer can be estimated based on the radii of curvature of the three mirrors and the distances between the secondary mirror 120 and first and third mirrors 110, 130. The optical design form of the Offner-Chrisp spectrometer is corrected for spherical aberration because the parent mirrors operate near their common center of curvature, and is corrected for coma by symmetry about the aperture stop. In addition, the Offner-Chrisp spectrometer is corrected for astigmatism when operating within the ring-field zone where third- and fifth-order astigmatism balance, but only for a single wavelength, which is typically chosen to be the central wavelength of the spectral bandwidth.

Although the Offner-Chrisp imaging spectrometer is well known, the optical form has significant performance limitations that reduce its suitability or usability in systems with large slit formats. The double-pass Reflective Triplet spectrometer optics configuration can handle larger slit formats and offers additional advantages such as multiple channel operation using multiple dispersive elements and multiple FPAs. However, the Reflective Triplet is more complex and costly than desired if only a single spectrometer channel is needed.

Some attempts have been made to achieve spectral broadening (increased spectral bandwidth) and spatial or field of view broadening (increased slit length) in the Offner-Chrisp spectrometer form using so-called "free-form" or Zernike-described optical surfaces, as discussed for example in Freeform spectrometer enabling increased compactness, Jacob Riemers et al., *Light: Science & Applications* (2019), 6, e17026; doi: 10.1038/lsa.2017.26 (hereinafter referred to as "Riemers"). However, while indeed achieving some improvements over the classical Offner-Chrisp geometry in certain respects, the designs in Riemers still have performance limitations and therefore disadvantages for some applications.

SUMMARY OF INVENTION

Aspects and embodiments are directed to an optical configuration for an imaging spectrometer that expands upon the Offner-Chrisp geometry to provide increase capability and performance, also exceeding what has been achieved by the Riemers designs. For a single channel spectrometer system, embodiments of the optical configuration disclosed herein may provide a simpler and more cost-effective solution than the reflective triplet.

According to one embodiment, an imaging spectrometer comprises an entrance slit having a length in a cross-scan direction, a primary mirror having a first free-form optical surface and positioned to receive optical radiation from the entrance slit and to reflect the optical radiation, the primary mirror being spaced a first distance from the entrance slit measured along a primary optical axis of the imaging spectrometer, a secondary mirror having a second free-form optical surface and a diffraction grating formed on the second free-form optical surface, the secondary mirror positioned to receive the optical radiation from the primary mirror, and configured to disperse the optical radiation into its spectral components to produce dispersed optical radiation, and to reflect the dispersed optical radiation, the secondary mirror being spaced from the primary mirror by a second distance measured along the primary optical axis, the second distance being approximately 0.68 of the first distance, and a tertiary mirror having a third free-form optical surface and positioned and configured to receive the dispersed optical radiation reflected from the secondary mirror and to reflect and focus the dispersed optical radiation onto an image plane coincident with the entrance slit.

In one example, the primary mirror has positive optical power, the secondary mirror has negative optical power, and the tertiary mirror has positive optical power.

In another example, the length of the entrance slit is at least 11 centimeters and the first distance from the entrance slit to the primary mirror is approximately 23 cm.

In one example, an optical speed of the imaging spectrometer is F/2.6.

In one example, each of the first free-form optical surface, the second free-form optical surface, and the third free-form optical surface is defined by Zernike polynomials including a $37^{th}$ Zernike term. In another example, coefficients of the Zernike polynomials are selected to correct for optical aberrations over a field of view of the imaging spectrometer to an average RMS wavefront error of 0.08 micrometers. A spectral range over which the optical aberrations are corrected may include wavelengths from 0.4 micrometers to 2.5 micrometers.

In one example, the imaging spectrometer has a physical length that is twice the length of the entrance slit.

According to another embodiment, an imaging spectrometer system comprises an entrance slit having a length in a cross-scan direction, foreoptics configured to receive optical radiation from a viewed scene and to form a telecentric image at the entrance slit, and spectrometer optics consisting of a primary mirror, a secondary mirror having a diffraction grating formed thereon, and a tertiary mirror, each of the primary mirror, the secondary mirror, and the tertiary mirror having free-form non-rotationally symmetric surface figures defined by Zernike polynomials, the spectrometer optics being configured to receive the telecentric image at the entrance slit, to disperse the optical radiation into its spectral components to provide dispersed optical radiation, and to focus the dispersed optical radiation onto an image plane positioned in a common plane with the entrance slit, the spectrometer optics having a physical length that is twice the length of the entrance slit.

In one example, the primary mirror is positioned a first distance from the entrance slit measured along a primary axis of the spectrometer optics, and the secondary mirror is positioned a second distance from the entrance slit measured along the primary axis, a ratio of the second distance to the first distance being 0.32.

In another example, the primary mirror has positive optical power, the secondary mirror has negative optical power, and the tertiary mirror has positive optical power.

In another example, the Zernike polynomials include a $37^{th}$ Zernike term.

In one example, the length of the entrance slit is at least 11 centimeters and the first distance from the entrance slit to the primary mirror is approximately 23 cm.

In another example, an optical speed of the imaging spectrometer is F/2.6, and coefficients of the Zernike polynomials are selected to correct for optical aberrations over a field of view of the spectrometer optics to an average RMS wavefront error of 0.08 micrometers over a wavelength range of 0.4 micrometers to 2.5 micrometers.

In one example, the foreoptics is an all-reflective foreoptics.

According to another embodiment, an imaging spectrometer optical apparatus comprises an entrance slit having a length in a cross-scan direction, and spectrometer optics consisting of a primary mirror, a secondary mirror having a diffraction grating formed thereon, and a tertiary mirror, each of the primary mirror, the secondary mirror, and the tertiary mirror having free-form non-rotationally symmetric surface figures defined by Zernike polynomials, the spectrometer optics being configured to incident optical radiation in the form of a telecentric image at the entrance slit, to disperse, with the diffraction grating, the optical radiation into its spectral components to provide dispersed optical radiation, and to focus the dispersed optical radiation onto an image plane positioned in a common plane with the entrance slit, the spectrometer optics having a physical length that is twice the length of the entrance slit.

In one example, the primary mirror has positive optical power, the secondary mirror has negative optical power, and the tertiary mirror has positive optical power.

In another example, the Zernike polynomials include a $37^{th}$ Zernike term.

In another example, the primary mirror is spaced a first distance from the entrance slit measured along a primary optical axis of the spectrometer optics, and wherein the secondary mirror is spaced from the primary mirror by a second distance measured along the primary optical axis, the second distance being approximately 0.68 of the first distance.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 2B is a corresponding partial ray trace of the example of the optics configuration of FIG. 2A, shown in the cross-scan direction, according to aspects of the present invention;

DETAILED DESCRIPTION

As discussed above, the Offner-Chrisp optical form, composed of all-spherical surfaces, is often a preferred choice for single-channel imaging spectrometers. However, the design has significant limitations for large cross-scan formats (i.e., long entrance slits) due to its reliance on strict optical symmetry constraints. Aspects and embodiments are directed to an optical form for an imaging spectrometer that departs from those symmetry constraints and greatly increases the capability to accurately image large cross-scan format fields of view. Yet the simplicity of the Offner-Chrisp configuration is largely conserved.

Figure 1:
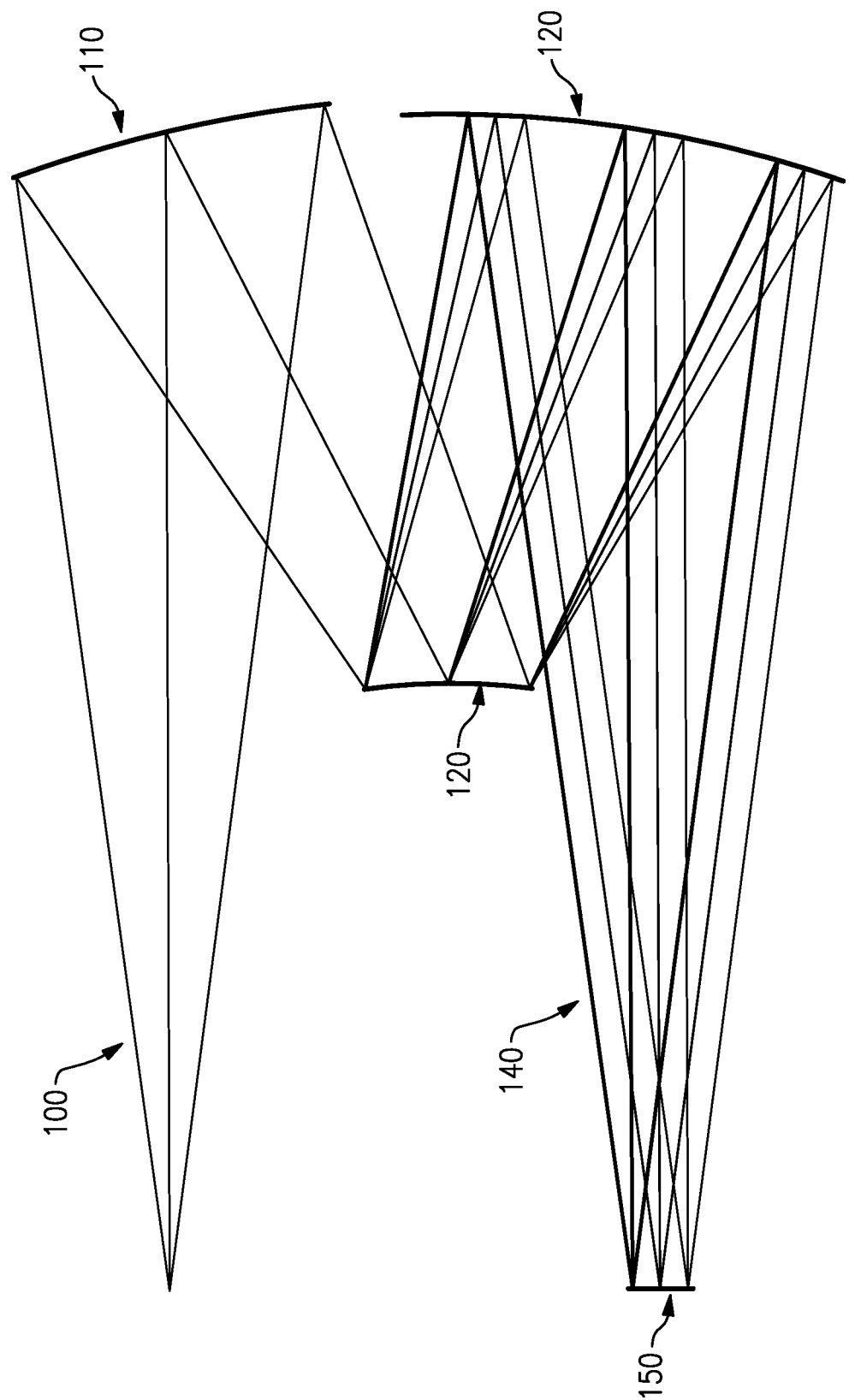
FIG. 1 is a partial ray trace of one example of the prior art Offner-Chrisp imaging spectrometer optics geometry.
Figure 2A:
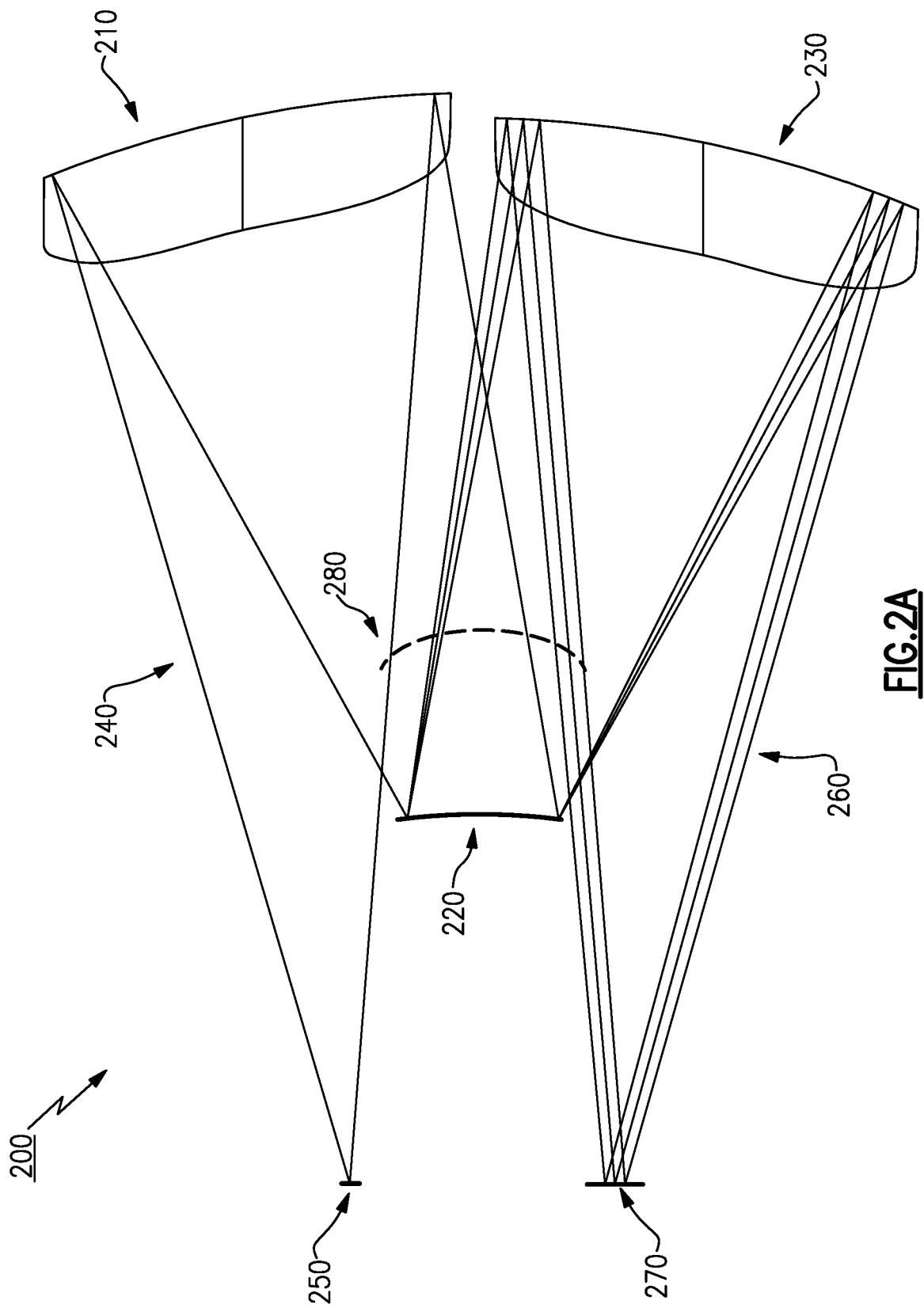
FIG. 2A is a partial ray trace, shown in the long-scan direction, of one example of an optics configuration for an imaging spectrometer according to aspects of the present invention.

Referring to FIGS. 2A and 2B, aspects are directed to a three-mirror spectrometer optics configuration. FIG. 2A is a partial ray trace of the optical apparatus 200 shown in the long-scan direction (i.e., the direction in which the slit is scanned across a scene to be imaged and orthogonal to the length of the slit), and FIG. 2B is a corresponding partial ray trace of the optical apparatus 200 shown in the cross-scan direction (i.e., same direction as the length of the slit). The optical apparatus 200 includes a primary mirror 210, a secondary mirror 220, and a tertiary mirror 230. A diffraction grating is formed on the surface of the secondary mirror 220, as discussed above. As in the classical Offner-Chrisp configuration, the power sequence of the three mirrors is +, −, +. That is, the primary mirror 210 has positive optical power, the secondary mirror 220 has negative optical power, and the tertiary mirror 230 has positive optical power. However, unlike the conventional Offner-Chrisp spectrometer, which uses three spherical mirrors, embodiments of the optical apparatus 200 uses three Zernike-described mirror surfaces, which provides far greater design flexibility. In addition, embodiments of the optical apparatus 200 depart from the conventional 2:1 ratios for the mirror radii of curvature and mirror spacings required by examples of the conventional Offner-Chrisp spectrometer, which together with the use of Zernike-described surfaces, greatly extends the slit size, field of view, optical speed, and image quality bounds of the Offner-Chrisp configuration, as discussed further below.

As known to those skilled in the art, the Zernike polynomials are a widely-used set of mathematical equations that describe the optical surfaces in terms of x and y dimensions, and are orthogonal in sag (z). Unlike anamorphic mirror surfaces (such as spherical, aspherical or toroidal surfaces) Zernike-described mirror surfaces may have no rotational or translational symmetry, and therefore provide great flexibility in terms of designing the surface to achieve desired optical properties, such as minimal aberrations (e.g., coma, astigmatism, field distortion, etc.) over the field of view.

Still referring to FIGS. 2A and 2B, optical radiation 240 is received via an entrance slit 250 and directed to the primary mirror 210. As discussed further below, the optical apparatus 200 is capable of providing high performance imaging for large entrance slits, for example of at least 11 centimeters (cm) in length. The optical radiation 240 is reflected from the primary mirror 210 to the secondary mirror 220, where the diffraction grating disperses the optical radiation 240 into its spectral components to provide dispersed optical radiation 260. The dispersed optical radiation 260 is directed to the tertiary mirror 230, reflected from the tertiary mirror 230, and focused onto an image plane (or focal plane) 270, where an imaging detector, such as a two-dimensional focal plane array, may be located. As discussed above, in embodiments of the optical apparatus 200, the mirror spacings depart from the 2:1 ratio specified in the classical Offner-Chrisp geometry. Dashed line 280 represents the hypothetical location of the secondary mirror 220 according to Offner-Chrisp. As shown, the actual location of the secondary mirror 220 in the optical apparatus 200 is positioned well back from the location 280, far closer to the slit 250 and image plane 270. The primary mirror 210 is located a first distance from the entrance slit 250, measured along a primary optical axis of the optical apparatus 200, and the secondary mirror 220 is located a second distance from the entrance slit 250, measured along the primary optical axis. In certain examples, the second distance is less than half of the first distance. More particularly, in certain examples, the second distance is approximately 0.68 of the first distance. Stated another way, in certain examples, a ratio of the second distance to the first distance is approximately 0.32. As may be seen with reference to FIGS. 2A and 2B, this is a significant departure from the conventional location 280 of the secondary mirror 220 in an Offner-Chrisp configuration. A combination of this location of the secondary mirror 220, particularly the relative spacings of the primary mirror 210 and secondary mirror 220 relative to the entrance slit 250, along with the use of Zernike-described surface figures for the primary mirror 210, secondary mirror 220, and tertiary mirror 230, allow the optical apparatus 200 to achieve significantly improved capability, in particular, the ability to image over a far larger slit length (e.g., at least 11 cm, versus only 1 or 2 cm for conventional spectrometer formats) while maintaining a very compact package size (e.g., a physical length to slit length ratio of 2.0).

Figure 3A:
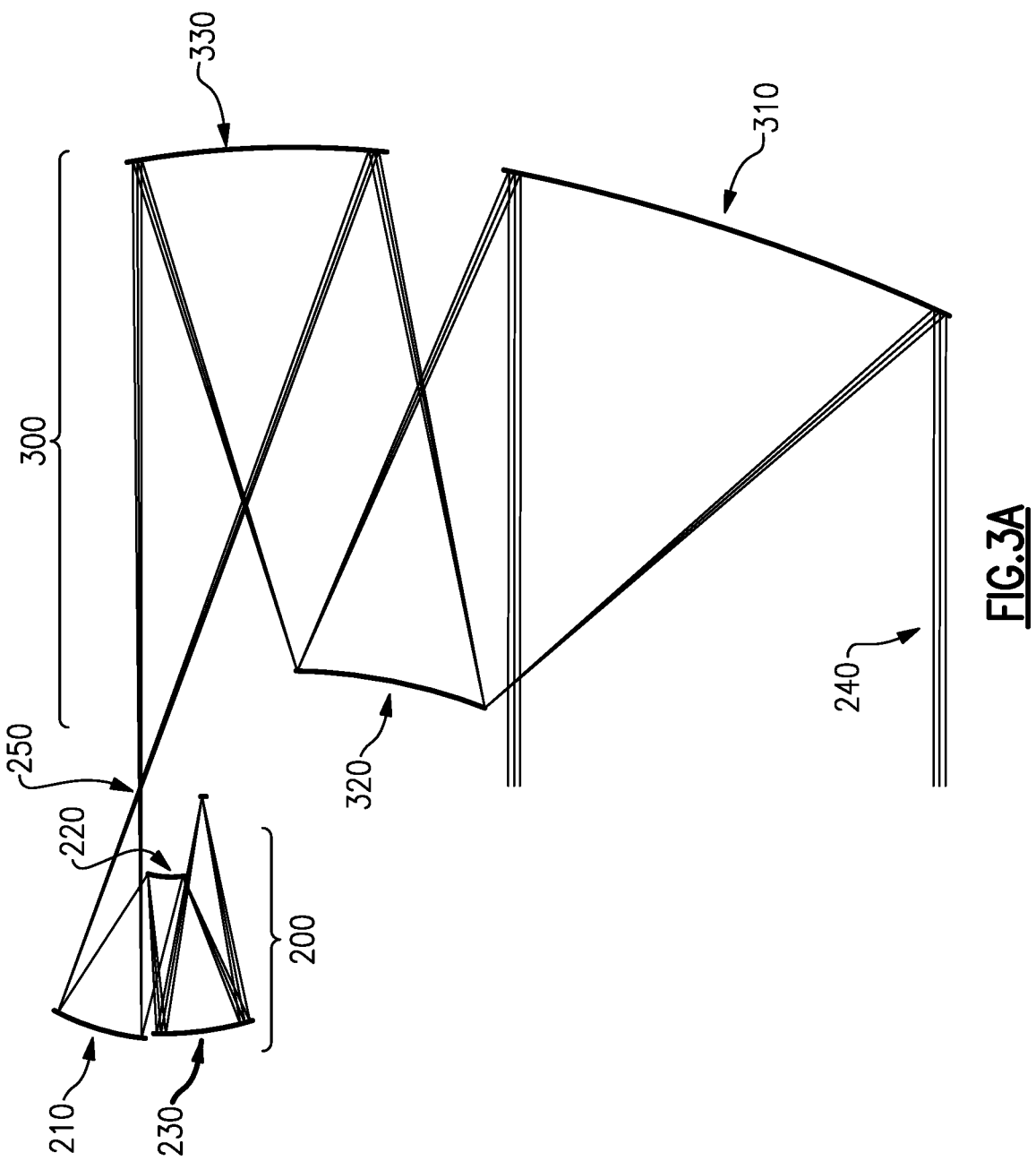
FIG. 3A is a partial ray trace showing, in the ling-scan direction, an example of foreoptics that can be used to supply the incident optical radiation to the imaging spectrometer optics according to aspects of the present invention.
Figure 3B:
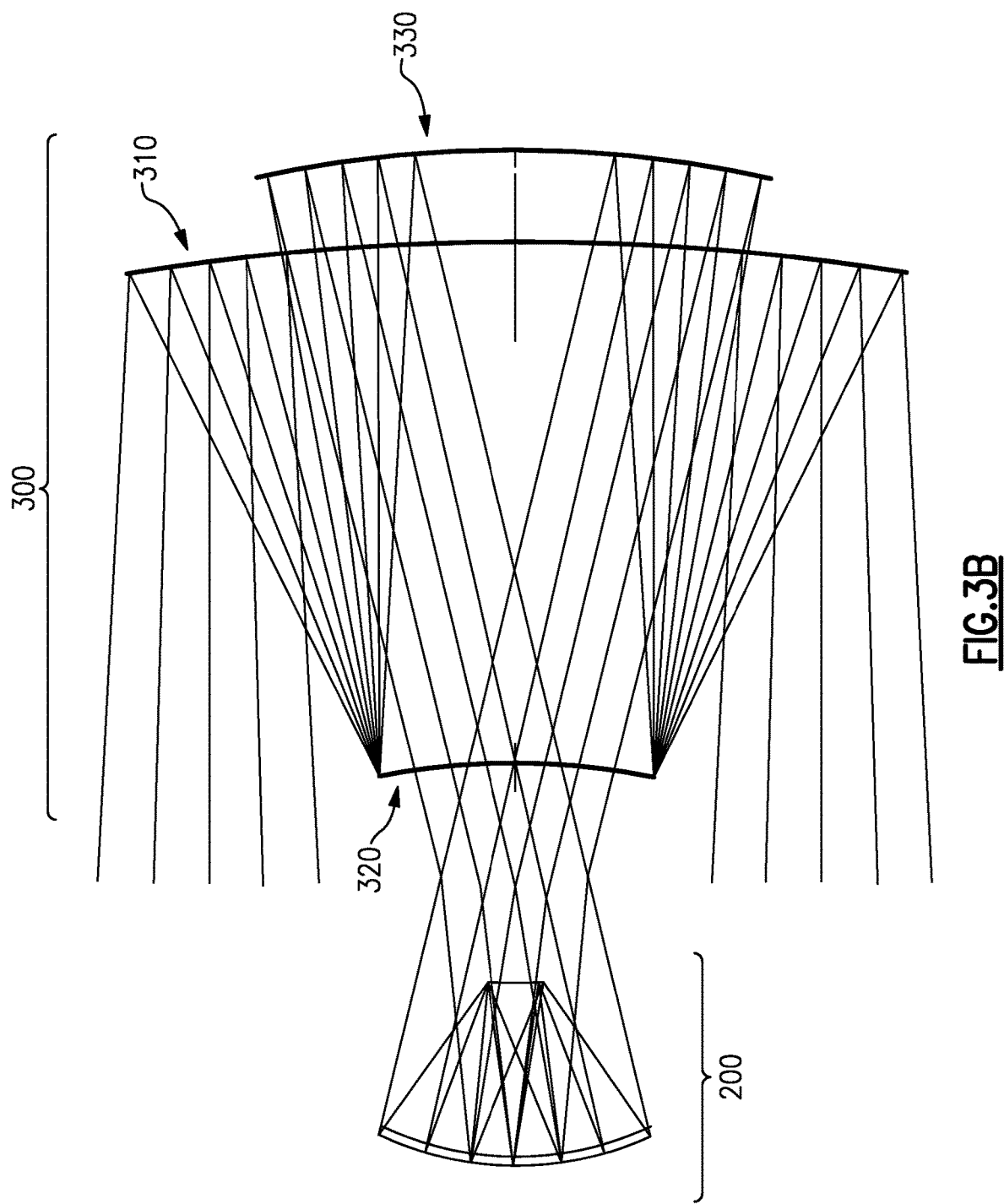
FIG. 3B is a corresponding partial ray trace of the example of the foreoptics and spectrometer optics of FIG. 3A, shown in the cross-scan direction, according to aspects of the present invention.

According to certain embodiments for imaging spectrometer applications, the optical radiation 240 is received at the entrance slit 250 in the form of a telecentric image. Accordingly, for completeness, FIGS. 3A and 3B illustrate an example of foreoptics 300 that can be used to supply the telecentric image at the entrance slit 250 of the optical apparatus 200. FIG. 3A is a partial ray trace shown in the long-scan direction, and FIG. 3B is a corresponding partial ray trace shown in the cross-scan direction. In the illustrated example, the foreoptics 300 has a three-mirror configuration, including a first mirror 310, a second mirror 320, and a third mirror 330, having a +,−,+power sequence, as taught in U.S. Pat. No. 4,240,707, for example. The optical radiation 240 is received from a scene or object being imaged at the first mirror 310, reflected to the second mirror 320, further reflected to the third mirror 330, and then reflected to the entrance slit 250. The optical powers and arrangements of the three mirrors of the foreoptics 300 are selected to provide the telecentric image at the entrance slit 250. Examples of three mirror configurations that can be used for the foreoptics 300 include, but are not limited to, a reflective triplet (described in U.S. Pat. No. 4,240,707, for example) or the imaging optical system of U.S. Pat. No. 8,714,760, which is incorporated herein in its entirety. Those skilled in the art will appreciate, however, that the foreoptics 300 is not limited to a three-mirror design, and may include any reflective, refractive, or catadioptric system, that can be configured to provide the desired telecentric image. An all-reflective foreoptics 300 may be advantageous in certain applications because all-reflective systems do not suffer from chromatic limitations as refractive systems do, and using fewer optical elements (e.g., a three-mirror design rather than a four- or five-mirror design) may be advantageous in terms of overall size and cost of the system; however, nonetheless, the foreoptics 300 may have any suitable optical form and is not limited to the example shown in FIGS. 3A and 3B.

Tables 1 and 2 presented below provide an optical prescription for one embodiment of the optical apparatus 200 shown in FIGS. 2A-3B. It is to be appreciated however, that the prescription given in Tables 1 and 2 is merely exemplary, and that the prescriptions of various embodiments of the optical apparatus 200 may be determined by the intended task to be performed by the imaging spectrometer and desired system characteristics. The embodiment of the optical apparatus 200 corresponding to the optical prescription given in Tables 1 and 2 has the following characteristics and performance parameters:

Slit length: 113 mm (corresponding 113 mm cross-scan image format)
Slit width: 18 micrometers;
Slit offset: 2.8605 cm;
Ratio of physical length to slit length: 2;
F-number (optical speed): F/2.6;
Spectral coverage: 0.4 to 2.5 micrometers (μm);
Grating period: 49.632 μm;
Dispersed spectral format: 0.4 cm;
Aperture stop offset: 0.0980 cm;
Image offset: −2.9505 cm;
Image tilt: −2.3153 degrees;

Aperture stop diameter: 3.4 cm;
Input f-cone: 20.5 degrees;
Output f-cone: 20.9 degrees;
Slit to imaging sensor magnification: 1.00; and
Average RMS wavefront error: 0.08 μm.

TABLE 1

| Surface | Description | Radius (cm) | Thickness (cm) |
|---|---|---|---|
| 1 | Slit plane (250) | Infinity | 23.3552 |
| 2 | Primary mirror (210) | −26.3192 | −15.8200 |
| 3 | Secondary mirror/Grating/Aperture stop (220) | −13.5867 | 15.0732 |
| 4 | Tertiary mirror (230) | −25.6067 | −22.6038 |
| 5 | Image plane (270) | infinity | 0.0 |

In Table 1, the column designated "Description" identifies the optical surfaces, with the reference numerals corresponding to FIGS. 2A and 2B given in parentheses. The column designated "Radius" provides the radius of curvature of the corresponding surface in centimeters (cm), with the minus sign indicating that the center of curvature is to the left of the mirror surface. The column designated "Thickness" provides the distance between the respective surface and the next surface (identified in the adjacent lower row of the table), measured in centimeters.

Table 2 includes the Zernike polynomial coefficient terms for the relevant respective surfaces corresponding to Table 1.

TABLE 2

| Zernike Term | Surface 2 | Surface 3 | Surface 4 |
|---|---|---|---|
| Z3 | −3.963E−03 | −3.133E−03 | −1.142E−03 |
| Z5 | 1.013E−04 | 1.850E−03 | 1.081E−03 |
| Z8 | −5.900E−06 | −8.677E−05 | 4.987E−06 |
| Z9 | −1.512E−07 | −6.835E−06 | −1.160E−08 |
| Z11 | 3.363E−06 | 4.455E−05 | −6.256E−06 |
| Z12 | 2.806E−07 | 9.185E−06 | 8.016E−09 |
| Z15 | −5.460E−09 | −1.774E−07 | 1.271E−08 |
| Z16 | −1.227E−10 | 1.433E−07 | 1.005E−10 |
| Z17 | −4.887E−08 | 2.178E−06 | 2.096E−07 |
| Z20 | −7.952E−10 | −4.166E−07 | −5.404E−09 |
| Z21 | 1.068E−10 | 2.050E−08 | 6.003E−11 |
| Z24 | 1.033E−11 | 7.278E−08 | −1.690E−11 |
| Z25 | −1.399E−13 | −5.949E−08 | −2.799E−13 |
| Z27 | 2.596E−09 | 3.846E−07 | 2.251E−09 |
| Z31 | −7.9670E−13 | 8.1520E−09 | 2.5510E−12 |
| Z32 | 8.266E−15 | −3.124E−10 | 1.272E−13 |
| Z35 | −1.142E−14 | −3.868E−09 | 1.162E−14 |
| Z36 | 1.820E−16 | 7.448E−09 | 2.241E−16 |
| Z37 | −3.495E−20 | −3.106E−10 | −2.883E−20 |

The Zernike coefficient terms provided in Table 2 are calculated according to the equations provided below.

$$s = \sqrt{x^2 + y^2}$$

$$Z_5(x,y) = s^2 \cos(2\theta) = x^2 - y^2$$

$$Z_8(x,y) = (3s^3 - 2s)\sin(\theta) = y(3x^2 + 3y^2 - 2)$$

$$Z_9(x,y) = 6s^4 - 6s^2 + 1 = 6x^4 + 12x^2y^2 + 6y^4 - 6x^2 - 6y^2 + 1$$

$$Z_{11}(x,y) = s^3 \sin(3\theta) = y(3x^2 - y^2)$$

$$Z_{12}(x,y) = (4s^4 - 3s^2)\cos(2\theta) = (x^2 - y^2)(4x^2 + 4y^2 - 3)$$

$$Z_{15}(x,y) = (10s^5 - 12s^3 + 3s)\sin(\theta) = y(10x^4 + 20x^2y^2 + 10y^4 - 12x^2 - 12y^2 + 3)$$

$$Z_{16}(x,y) = 20s^6 - 30s^4 + 12s^2 - 1 = 20x^6 + 60x^4y^2 + 60x^2y^4 + 20y^6 - 30x^4 - 60x^2y^2 - 30y^4 + 12x^2 + 12y^2 - 1$$

$$Z_{17}(x,y) = s^4 \cos(4\theta) = x^4 - 6x^2y^2 + y^4$$

$$Z_{20}(x,y) = (5s^5 - 4s^3)\sin(3\theta) = y(3x^2 - y^2)(5x^2 + 5y^2 - 4)$$

$$Z_{21}(x,y) = (15s^6 - 20s^4 + 6s^2)\cos(2\theta) = (x^2 - y^2)[5x^2(3x^2 + 6y^2 - 4) + 5y^2(3y^2 - 4) + 6]$$

$$Z_{24}(x,y) = (35s^7 - 60s^5 + 30s^3 - 4s)\sin(\theta) = y\{5x^2[x^2(7x^2 + 21y^2 - 12) + 3y^2(7y^2 - 8) + 6] + 5y^2(7y^4 + 12y^2 + 6) - 4\}$$

$$Z_{25}(x,y) = 70s^8 - 140s^6 + 90s^4 - 20s^2 + 1 = 70x^8 + 280x^6y^2 + 420x^4y^4 + 280x^2y^6 + 70y^8 - 140x^6 - 420x^4y^2 - 420x^2y^4 - 140y^6 + 90x^4 + 180x^2y^2 + 90y^4 - 20x^2 - 20y^2 + 1$$

$$Z_{27}(x,y) = s^5 \sin(5\theta) = 5x^4y - 10x^2y^3 + y^5$$

$$Z_{31}(x,y) = (21s^7 - 30s^5 + 10s^3)\sin(3\theta) = y(3x^2 - y^2)[3x^2(7x^2 + 14y^2 - 10) + 3y^2(7y^2 - 10) + 10]$$

$$Z_{32}(x,y) = (56s^8 + 105s^6 + 60s^4 - 10s^2)\cos(2\theta) = (x^2 - y^2)\{x^2[7x^2(8x^2 + 24y^2 - 15) + 42y^2(4y^2 - 5) + 60] + y^2(56y^4 - 105y^2 + 60) - 10\}$$

$$Z_{35}(x,y) = (126s^9 - 280s^7 + 210s^5 + 60s^3 + 5s)\sin(\theta) = y\{2x^2[7x^2(x^2(9x^2 + 36y^2 - 20) + 6y^2(9y^2 - 10) + 15) + 42y^2(6y^4 - 10y^2 + 5) - 30] + 2y^2[y^2(63y^4 - 140y^2 + 105) - 30] + 5\}$$

$$Z_{36}(x,y) = 252s^{10} - 630s^8 + 560s^6 - 210s^4 + 30s^2 - 1 = 252x^{10} + 1260x^8y^2 + 2520x^6y^4 + 2520x^4y^6 + 1260x^2y^8 + 252y^{10} - 630x^8 2520x^6y^2 - 3780x^4y^42520x^2y^6 - 630y^8 + 560x^6 + 1680x^4y^2 + 1680x^2y^4 + 560y^6 210x^4 - 420x^2y^2 - 210y^4 + 30x^2 + 30y^2 1$$

$$Z_{37}(x,y) = 924s^{12} - 2772s^{10} + 3150s^8 + 1680s^6 + 420s^4 - 42s^2 + 1 = 924x^{12} + 5544x^{10}y^2 + 13680x^8y^4 + 18480x^6y^6 + 13680x^4y^8 + 5544x^2y^{10} + 924y^{12} - 2772x^{10} - 13860x^8y^2 - 27720x^6y^4 - 27720x^4y^6 - 13860x^2y^8 - 2772y^{10} + 3150x^8 + 12600x^6y^2 + 18900x^4y^4 + 12600x^2y^6 + 3150y^8 - 1680x^6 5040x^4y^2 - 5040x^2y^4 - 1680y^6 + 420x^4 + 840x^2y^2 + 420y^4 - 42x^2 - 42y^2 + 1$$

As noted above, the exemplary embodiment of the optical apparatus 200 achieves an average RMS wavefront error of only 0.08 μm, along with an optical speed of F/2.6 while using a slit of 113 mm (suitable for large format cross-scan applications) and having a physical length to slit length ratio of 2.0. As discussed above, the conventional Offner-Chrisp spectrometer is unsuitable for large cross-scan image formats. If one were to construct an Offner-Chrisp spectrometer according to the same parameters (i.e., a slit length of 113 mm, a physical length to slit length ratio of 2.0, and F/2.6) based on the conventional Offner-Chrisp design constraints (namely, spherical mirrors and a 2:1 ratio for mirror spacings and radii), the resulting average RMS wavefront error is 3.04 μm, meaning that the system is unusable. As noted in Riemers, the conventional Offner-Chrisp spectrometer is limited to small slit lengths, for example, ~10 mm. In contrast, Riemers discloses a system with comparable average RMS wavefront error (~0.07 μm); however, the slit length is only 20 mm, still far less than what can be achieved using embodiments of the optical apparatus 200 disclosed herein, and the ratio of the physical length to slit length is 12.5. Thus, while the Riemers system is "compact" compared to an operational (i.e., having acceptable performance characteristics) conventional Offner-Chrisp spectrometer, embodiments of the optical apparatus 200 disclosed herein achieve a far more compact arrangement for much greater slit lengths. In addition, Riemers discloses a system having a spectral coverage (wavelength range) of 0.4 to 1.0 μm, whereas embodiments of the optical apparatus 200 achieve the above-noted performance characteristics over a much larger wavelength range of 0.4 to 2.5 µm.

Thus aspects and embodiments provide imaging spectrometer optics that retain the simplicity of the three-mirror Offner-Chrisp form, but depart from the conventional Offner-Chrisp geometry in several key aspects so as to provide significantly enhanced capability and performance. As discussed above, in the optical apparatus 200, the mirror surface figures as not spheres (as in Offner-Chrisp), but are instead higher order non-rotationally aspheres defined by Zernike polynomial terms ("free-form" surfaces). In addition, the mirror greatly depart from the 2:1 ratio of the Offner-Chrisp configuration, and the mirror radii also depart from the 2:1 ratio of the Offner-Chrisp configuration. These structural differences of embodiments of the optical apparatus 200 from the Offner-Chrisp configuration lead to significant functional advantages, including the ability to image a cross-scan format that is half as large as the longest conjugate of the optics (for example: an 11 cm format and 22 cm input-output conjugate), correction of all aberrations to be diffraction limited at about 1 um wavelength, and to reduce relevant distortion terms (such as keystone and spectral stretch) to a level that is about 10% of the pixel size of the imaging sensor. For example, ray trace simulations of an example of the system of FIGS. 3A and 3B, using an example of the optical apparatus 200 according to the optical prescription given in Tables 1 and 2, and a focal plane array (FPA) imaging sensor having 6300 pixels in the cross-scan dimension and 222 spectral pixels with a pixel width of 18 µm (corresponding to the slit width noted above) indicated a maximum keystone over the effective field of view of 2.1 µm and a maximum spectral stretch of 2.3 µm.

Thus, aspects and embodiments may provide a significant improvement in the capabilities of Offner-Chrisp-type spectrometer optics where advanced Zernike-described ("free-form") mirror figures are employed on all three mirrors. Further, with the departure from the strict 2:1 ratio of mirror powers and spacings of the conventional Offner-Chrisp form, a remarkable improvement may be obtained in slit size (field of view), along with physical size reduction, superior image quality, and superior distortion correction.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. The term optical radiation refers generally to an electromagnetic signal that propagates through a given medium, and is not meant to imply any particular characteristic of the light, such as frequency or wavelength, band, coherency, spectral density, quality factor, etc., and may include infrared, visible, and/or ultraviolet electromagnetic radiation, or other non-ionizing electromagnetic radiation conventionally processed in the field of optics.

Accordingly, the foregoing description and drawings are by way of example only, and the scope of the invention should be determined from proper construction of the appended claims, and their equivalents.

What is claimed is:

1. An imaging spectrometer comprising:
    an entrance slit having a length in a cross-scan direction
    a primary mirror having a first free-form optical surface and positioned to receive optical radiation from the entrance slit and to reflect the optical radiation, the primary mirror being spaced a first distance from the entrance slit measured along a primary optical axis of the imaging spectrometer;
    a secondary mirror having a second free-form optical surface and a diffraction grating formed on the second free-form optical surface, the secondary mirror positioned to receive the optical radiation from the primary mirror, and configured to disperse the optical radiation into its spectral components to produce dispersed optical radiation, and to reflect the dispersed optical radiation, the secondary mirror being spaced from the primary mirror by a second distance measured along the primary optical axis, the second distance being approximately 0.68 of the first distance; and
    a tertiary mirror having a third free-form optical surface and positioned and configured to receive the dispersed optical radiation reflected from the secondary mirror and to reflect and focus the dispersed optical radiation onto an image plane coincident with the entrance slit.

2. The imaging spectrometer of claim 1 wherein the primary mirror has positive optical power, the secondary mirror has negative optical power, and the tertiary mirror has positive optical power.

3. The imaging spectrometer of claim 1 wherein the length of the entrance slit is at least 11 centimeters and the first distance from the entrance slit to the primary mirror is approximately 23 cm.

4. The imaging spectrometer of claim 1 wherein an optical speed of the imaging spectrometer is F/2.6.

5. The imaging spectrometer of claim 1 wherein each of the first free-form optical surface, the second free-form optical surface, and the third free-form optical surface is defined by Zernike polynomials including a $37^{th}$ Zernike term.

6. The imaging spectrometer of claim 5 wherein coefficients of the Zernike polynomials are selected to correct for optical aberrations over a field of view of the imaging spectrometer to an average RMS wavefront error of 0.08 micrometers.

7. The imaging spectrometer of claim 6 wherein a spectral range over which the optical aberrations are corrected includes wavelengths from 0.4 micrometers to 2.5 micrometers.

8. The imaging spectrometer of claim 1 wherein the imaging spectrometer has a physical length that is twice the length of the entrance slit.

9. An imaging spectrometer system comprising:
    an entrance slit having a length in a cross-scan direction;
    foreoptics configured to receive optical radiation from a viewed scene and to form a telecentric image at the entrance slit; and spectrometer optics consisting of a primary mirror, a secondary mirror having a diffraction grating formed thereon, and a tertiary mirror, each of the primary mirror, the secondary mirror, and the tertiary mirror having free-form non-rotationally symmetric surface figures defined by Zernike polynomials, the spectrometer optics being configured to receive the telecentric image at the entrance slit, to disperse the optical radiation into its spectral components to provide dispersed optical radiation, and to focus the dispersed optical radiation onto an image plane positioned in a common plane with the entrance slit, the spectrometer optics having a physical length that is twice the length of the entrance slit.

10. The imaging spectrometer system of claim 9 wherein the primary mirror is positioned a first distance from the entrance slit measured along a primary axis of the spectrometer optics, and the secondary mirror is positioned a second distance from the entrance slit measured along the primary axis, a ratio of the second distance to the first distance being 0.32.

11. The imaging spectrometer system of claim 10 wherein the primary mirror has positive optical power, the secondary mirror has negative optical power, and the tertiary mirror has positive optical power.

12. The imaging spectrometer system of claim 10 wherein the Zernike polynomials include a $37^{th}$ Zernike term.

13. The imaging spectrometer system of claim 10 wherein the length of the entrance slit is at least 11 centimeters and the first distance from the entrance slit to the primary mirror is approximately 23 cm.

14. The imaging spectrometer system of claim 10 wherein an optical speed of the imaging spectrometer is F/2.6, and wherein coefficients of the Zernike polynomials are selected to correct for optical aberrations over a field of view of the spectrometer optics to an average RMS wavefront error of 0.08 micrometers over a wavelength range of 0.4 micrometers to 2.5 micrometers.

15. The imaging spectrometer system of claim 9 wherein the foreoptics is an all-reflective foreoptics.

16. An imaging spectrometer optical apparatus comprising:
an entrance slit having a length in a cross-scan direction; and
spectrometer optics consisting of a primary mirror, a secondary mirror having a diffraction grating formed thereon, and a tertiary mirror, each of the primary mirror, the secondary mirror, and the tertiary mirror having free-form non-rotationally symmetric surface figures defined by Zernike polynomials, the spectrometer optics being configured to incident optical radiation in the form of a telecentric image at the entrance slit, to disperse, with the diffraction grating, the optical radiation into its spectral components to provide dispersed optical radiation, and to focus the dispersed optical radiation onto an image plane positioned in a common plane with the entrance slit, the spectrometer optics having a physical length that is twice the length of the entrance slit.

17. The imaging spectrometer optical apparatus of claim 16 wherein the primary mirror has positive optical power, the secondary mirror has negative optical power, and the tertiary mirror has positive optical power.

18. The imaging spectrometer optical apparatus of claim 13 wherein the Zernike polynomials include a $37^{th}$ Zernike term.

19. The imaging spectrometer optical apparatus of claim 16 wherein the primary mirror is spaced a first distance from the entrance slit measured along a primary optical axis of the spectrometer optics, and wherein the secondary mirror is spaced from the primary mirror by a second distance measured along the primary optical axis, the second distance being approximately 0.68 of the first distance.

* * * * *